United States Patent
Lee et al.

(10) Patent No.: US 8,421,919 B2
(45) Date of Patent: Apr. 16, 2013

(54) METHOD FOR DISPLAYING CAPTIONS AND ASSOCIATED EMBEDDED SYSTEM

(75) Inventors: Hsi-Hsin Lee, Hsinchu Hsien (TW); Cheng Hao Li, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 44 days.

(21) Appl. No.: 13/179,562

(22) Filed: Jul. 11, 2011

(65) Prior Publication Data

US 2012/0013800 A1    Jan. 19, 2012

(30) Foreign Application Priority Data

Jul. 13, 2010  (CN) .......................... 2010 1 0234573

(51) Int. Cl.
*H04N 11/00* (2006.01)
*H04N 5/445* (2011.01)

(52) U.S. Cl.
USPC .......................................... 348/468; 348/564

(58) Field of Classification Search ................. 348/468, 348/569, 564, 584, 58, 714, 716; 725/151, 725/137; 345/600–602, 636, 549, 551
See application file for complete search history.

(56) References Cited

U.S. PATENT DOCUMENTS

| | | | |
|---|---|---|---|
| 6,259,487 B1 * | 7/2001 | Bril ............................... | 348/553 |
| 6,369,855 B1 * | 4/2002 | Chauvel et al. ............. | 348/423.1 |
| 6,766,528 B1 * | 7/2004 | Kim et al. ...................... | 725/113 |
| 6,853,385 B1 * | 2/2005 | MacInnis et al. ............. | 345/629 |
| 7,605,865 B2 * | 10/2009 | Lin ................................. | 348/445 |
| 7,647,620 B2 * | 1/2010 | Van Der Meer et al. ...... | 725/151 |
| 8,159,613 B2 * | 4/2012 | Li ................................... | 348/564 |
| 2003/0227565 A1 * | 12/2003 | Hamilton et al. ............. | 348/468 |
| 2006/0204086 A1 * | 9/2006 | Gargi ............................. | 382/166 |
| 2007/0280295 A1 * | 12/2007 | Uchimura ..................... | 370/485 |

* cited by examiner

Primary Examiner — Victor Kostak

(74) Attorney, Agent, or Firm — Han IP Law PLLC

(57) ABSTRACT

A method for displaying captions and associated embedded system is provided. The method includes receiving a first caption image file and a first color index table with a first color quantity; receiving a second caption image file and a second color index table, offset-processing the second caption image file according to the first color quantity as an offset-processed second caption image file, and then storing the offset-processed second caption image file; address-shifting the second color index table according to the first color quantity, and storing the second color index table having been address-shift-processed; and displaying the first caption image file and the offset-processed second caption image file according to the first color index table and the second color index table, respectively.

14 Claims, 3 Drawing Sheets

METHOD FOR DISPLAYING CAPTIONS AND ASSOCIATED EMBEDDED SYSTEM

CROSS-REFERENCE TO RELATED PATENT APPLICATIONS

This patent application claims priority to Chinese Patent Application No. 201010234573.2 filed on Jul. 13, 2010, which is herein incorporated in its entirety by reference.

BACKGROUND

1. Technical Field

The present disclosure relates to a caption displaying method and associated embedded system, and more particularly to a caption display method applied to digital televisions and associated embedded system.

2. Description of Related Art

The rising demand for digital televisions due to the increasing popularity of digital programs has become a global trend. The European television standard, the digital video broadcasting (DVB), and the American television standard, the advanced television systems committee (ATSC), are the two mainstreams of current digital television standards. In the European standard, subtitle streams may be contained in image signals and captioned as an aid to ease the content comprehensibility of the program viewers.

The head-end system of digital televisions sends out or reads the subtitle streams contained in an image signal outputted from a digital video disc reader (DVD reader). The subtitle streams contain digital television captions which can be displayed on a screen by a caption decoding apparatus included in digital televisions. The decoding process described above may be realized utilizing software executables benefited from the more powerful microprocessors, graphics engines included in television chips in digital televisions.

The European television caption standards may utilize the color indices for defining the colors in caption, by utilizing fewer bits for representing caption colors in transmission. For example, 2 bits may be used to represent 4 colors, and 4 bits for representing 16 colors . . . etc, and therefore, each image that the caption image file sends out from the head-end system in a digital television is either represented in 2 bits or in 4 bits instead of using the original 16 bits or 32 bits. Thus, the head-end system is only required to send out the corresponding color index table of each caption image file to the digital television for displaying the desired colors utilizing the caption image file and the color index table.

Most digital television systems utilize the ARGB (Alpha, Red, Green, Blue) color mode for image displaying. The digital televisions require the color index tables for data format conversion to convert the color index data to ARGB data for displaying. The ARGB data size is much larger than the color index data. The conversion is often executed in the last image outputting stage for the digital televisions to reduce the memory demand.

The European digital television standard allows displaying plural captions according to plural speakers and the speaker's tones as an aid provided for the hearing impaired. Referring to FIG. 1 which illustrates a conventional system, head-end system 19 may send out two caption image files simultaneously, including a first caption image file 110 and a second caption image file 120, and the corresponding two color index tables, including a first color index table 111 and a second color index table 121, for the purpose of displaying a first caption image 11 and a second caption image 12 at different locations on the display screen simultaneously. Due to the discrepancies between the contents of the first color index table 111 and the second index table 121 sent out from the head-end system 19, for example, if the color index value "15" in the first and second color index tables corresponds to different ARGB data, then a false color may be displayed since an incorrect color index table was referred when a television 18 simultaneously display the first caption image 11 and the second caption image 12.

SUMMARY

The present disclosure discloses a caption display method applied between an embedded system and a head-end system, the method comprises receiving a first caption image file and a first color index table with a first color quantity; receiving a second caption image file and a second color index table, offset-processing the second caption image file according to the first color quantity as an offset-processed second caption image file, and then storing the offset-processed second caption image file; address-shifting the second color index table according to the first color quantity, and storing the second color index table having been address-shift-processed; and displaying the first caption image file and the offset-processed second caption image file according to the first color index table and the second color index table, respectively.

The present disclosure further discloses a digital television embedded system capable of receiving a signal from a head-end system comprising a first caption image file, a first color index table having a color quantity, a second caption image file and a second color index table. The embedded system comprises a graphics engine having an offset processing unit, a memory interface unit, a system memory and a graphics output processor. The offset processing unit receives the second caption image file and offset-processes the second caption image into an offset-processed second caption image file. The memory interface unit couples with the graphics engine. The system memory couples with a graphics engine through the memory interface unit for storing the first caption image file and the offset-processed second caption image file. The graphics output processor couples with the graphics engine comprising a palette register. The palette register may temporarily store the first color index table and address-shift a second color index table to form an address-shifted second color index table according to the color quantities of the first color index table, wherein the graphics output processor displays the first caption image file and the offset-processed second caption image file read from the graphics engine according to the first color index table and the address-shifted second color index table, respectively.

The present disclosure further discloses a caption display method applied in a digital television embedded system comprising receiving a plurality of caption image files and a plurality of color index tables, each color index table having a color quantity; selectively offset-processing the caption image files and storing the offset-processed files into a memory; selectively address-shifting the color index tables according to the color quantities for being stored into a palette register; and displaying the offset-processed caption image files according to the color index tables.

BRIEF DESCRIPTION OF THE DRAWINGS

The present disclosure will become more readily apparent to those ordinarily skilled in the art after reviewing the following detailed description and accompanying drawings.

DETAILED DESCRIPTION OF THE PREFERRED EMBODIMENTS

Figure 1:
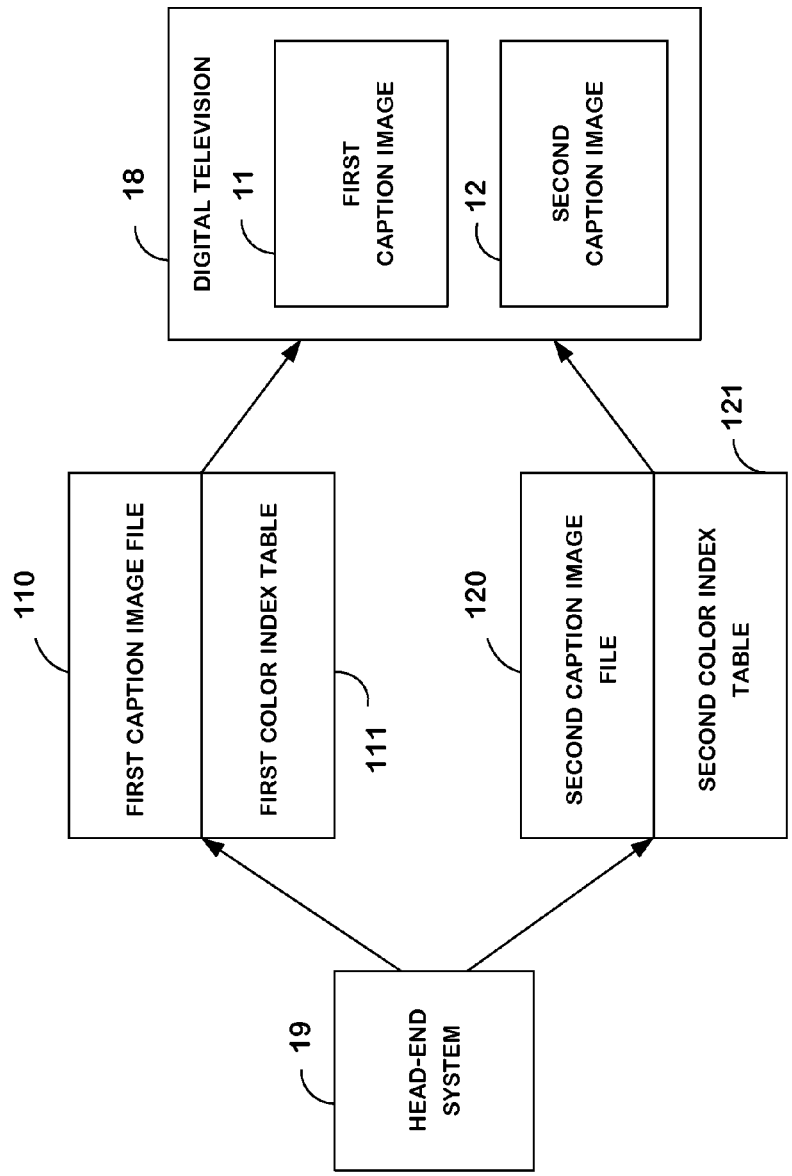
FIG. 1 is a diagram of caption display applied in digital televisions according to the prior art.
Figure 2:
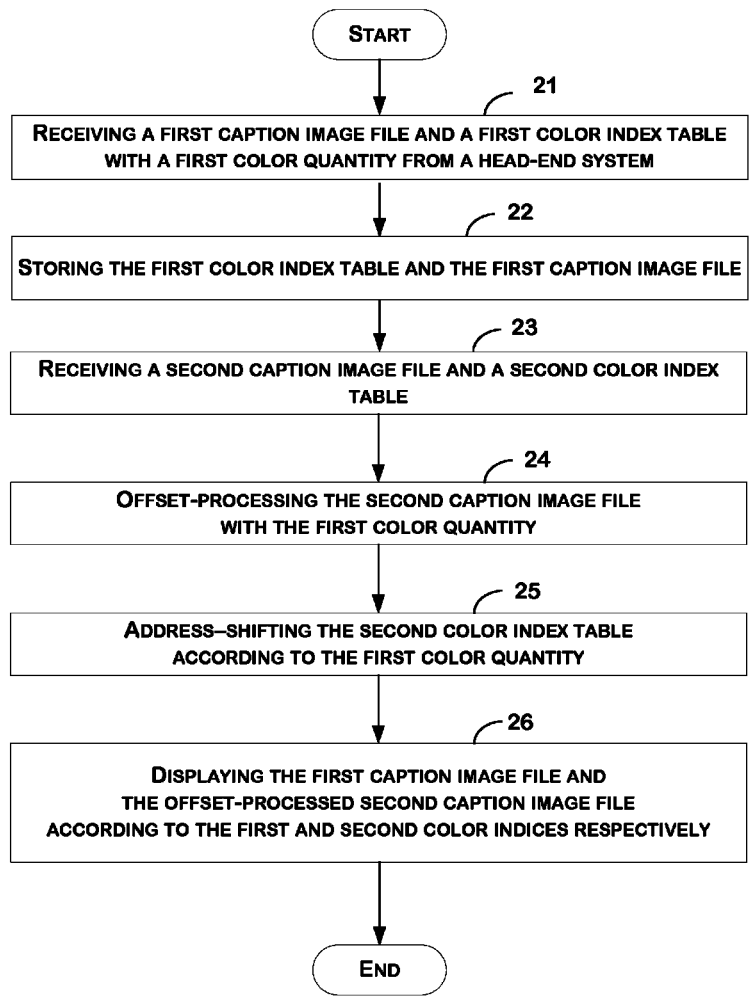
FIG. 2 is a flow chart of a caption display method according to one embodiment of the present disclosure.
Figure 3:
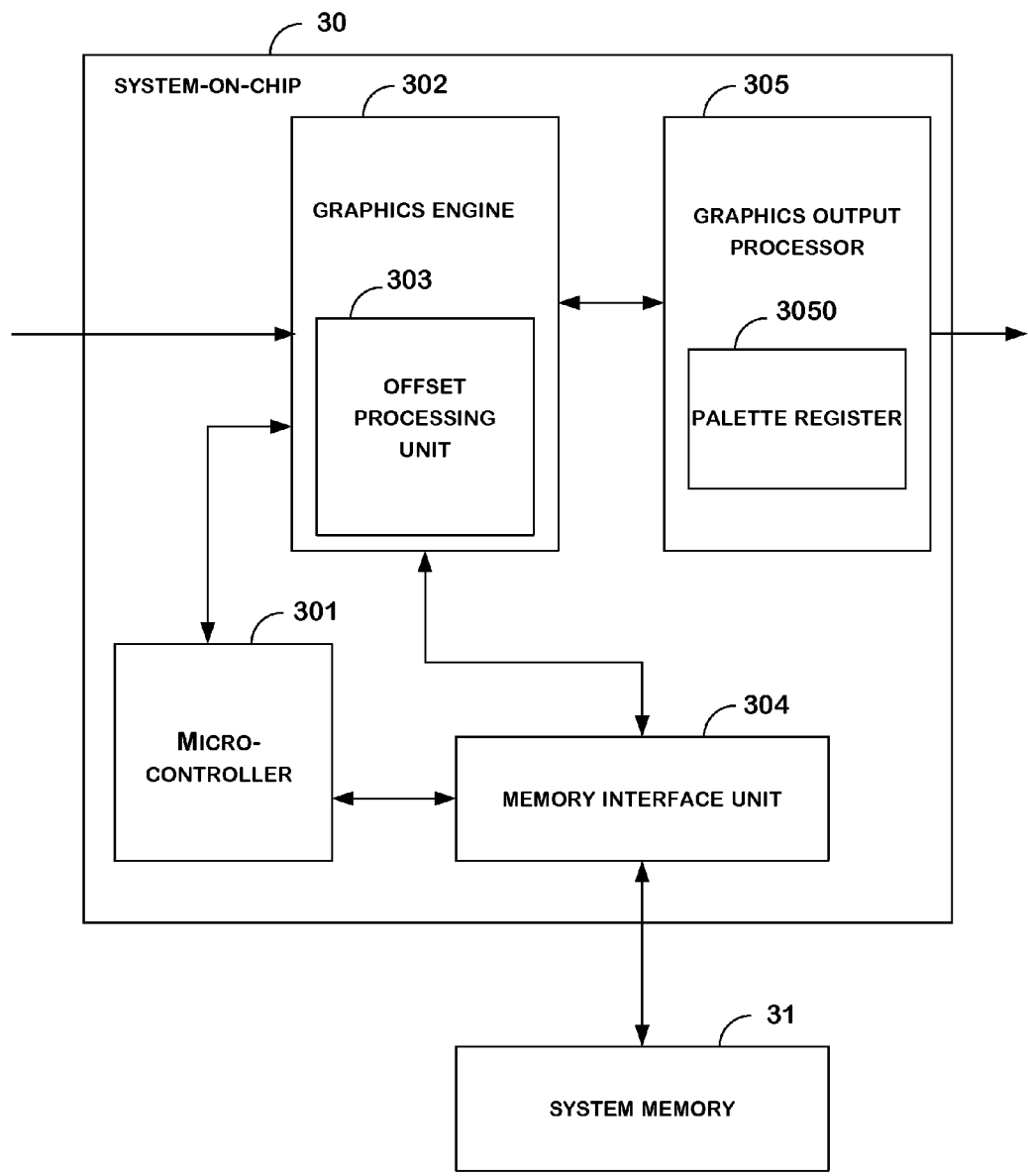
FIG. 3 is a block diagram of an embedded system of the digital television according to one embodiment of the present disclosure.

To improve the previously addressed problems, the present disclosure discloses a caption display method shown in FIG. 2. FIG. 3 discloses associated digital televisions or digital set-top boxes of embedded digital television systems, comprising a system-on-chip 30, a system memory 31. The system-on-chip 30 comprises a microcontroller 301, a graphics engine 302, an offset processing unit 303, a memory interface unit (MIU) 304, and a graphics output processor 305. The system memory 31 can be dynamic random access memory. The caption display method in FIG. 2 comprises the following steps:

In step 21, a television signal from the head-end system, comprising a first caption image file and a first color index table with a first color quantity, is received by an embedded system. For example, the first color image file may be in a bitmap format comprising a plurality of images, but only 4 bits of color indices are utilized to define 16 colors in each image. There exist the first caption image file with a first color quantity of 16 and a first color index table with 16 ARGB color values corresponding to 16 color indices. The bit length of the ARGB color values may be 16-bits or even 32-bits.

In step 22, the system-on-chip 30 temporarily stores the first color index table and the first caption image file. The first caption image file is stored in the system memory 31 of the embedded system, and the first color index table then may be stored in a palette register 3050, e.g. the static random access memory, of the graphics output processor 305 within the system-on-chip 30. The storing addresses are exemplified as follows:

| Address | Data |
| --- | --- |
| 0 | a first ARGB color value |
| 1 | a second ARGB color value |
| ... | ... |
| 15 | a sixteenth ARGB color value |

In step 23, a second caption image file and a second color index table from the head-end system is received by the embedded system. The second caption image file may be in bitmap format, wherein each image may also utilize 4 bits of color indices to define 16 colors. There exist a second caption image file with a second color quantity of 16 and a second color index table with 16 ARGB color values corresponding to 16 color indices. Alternatively, the second color quantity of the second caption image file generated by the head-end system may be different than the first color quantity of the first caption image file. Similarly, the content and size of the second color index table generated by the head-end system may be different than that generated by the first color index table.

In step 24, the offset processing unit 303 performs offset process on the second caption image file with the first color quantity and then stores the offset values into the system memory of the embedded system. In this embodiment, the first color quantity is 16. Every color index for every image in the second caption image shall add 16 before being stored.

In step 25, perform address-shifting on the second color index table according to the first color quantity and then store the same. In other words, it is to address shift, with the first color quantity, the storing location of the second color index table to the location after the first color index table, and stores the second color index table into the palette register 3050 sequentially, the content of the memory location after being address-shifted is exemplified as follows:

| Address | Data |
| --- | --- |
| 16 | a first ARGB color value |
| 17 | a second ARGB color value |
| ... | ... |
| 31 | a sixteenth ARGB color value |

In step 26, display the first caption image file and the offset-processed second caption image file according to the first and second color indices respectively.

The first caption image may be retrieved from the system memory 31 through the memory interface unit 304 by the graphics engine 302 and then be sent to the graphics output processor 305, and the graphics output processor 305 displays the caption with reference to the first color index table of the reference palette register 3050. In other words, and the caption is displayed according to the color index values in the caption image file with reference to the corresponding color values in the palette register 3050. The offset-processed second caption image is also retrieved from the system memory 31 through the memory interface unit 304 by the graphics engine 302 and outputted to the graphics output processor 305. Since the index value has already been offset-processed, the address-shifted second index table stored in the palette register 3050 can be correctly referenced. For example, an original color index of 1 is changed to 17 after being offset-processed, and the second ARGB color value of the second color index table can be correctly outputted for displaying.

Preferably, the embedded system may be designed for capable of displaying 8 caption image files simultaneously. If a third caption image file and a third color index table are received, the offset processing unit 303 performs offset process on the third caption image file according to the sum of the first color quantity and the second color quantity and then stores the offset-processed third caption image file into the system memory 31 of the embedded system. The third color index table is address-shifted to be stored at the location after the second color index table, and so on and so forth. For example, the fourth caption image file and the fourth color index table, and the eighth caption image file and the eighth shall also be stored with the similar arrangement. The ninth caption image file and the ninth color index table shall be set back to the first caption image file and the first color index table not only to satisfy the digital television standards but also to lower the cost. Alternatively, if the third caption image file and the third color index table are received, and the display of the first caption image file has already been completed. The memory space for storing the first color index table in the palette register 3050 is released, the offset processing unit 303 may store the data into the system memory 31 of the embedded system and overwrite the first color index table with the third color index table.

In another preferred embodiment of the present disclosure, the memory location of the color index table may be determined with reference to the size of the palette register 3050, e.g. implemented by the static random memory. Store the nth color index table shifted to the location after the n−1 color index table. Overwrite the original color index table with the current index table until address-shifting the color index table turns out to exceed the greatest address location of the palette register 3050. The described process can ensure the correct colors be displayed by avoiding the currently used color index tables from being overwritten.

The digital television system according to the present disclosure may start the format conversion between the ARGB and the color index data at the image output stage in the end without occupying excess memory resources. Furthermore, with the offset and address shifting process, the system can refer to the correct color index and ensure the correct color displaying.

To sum up, the present disclosure discloses a caption display method, applied in an embedded system of the digital television, comprising a plurality of received caption image files and a plurality of color index tables. The color index tables possess a plurality of color quantities, respectively. Selectively offset the caption image files according to the color quantities and store the same into the memory. Preferably, perform offset process on the current caption image file of the caption image files according to the prior color quantities. For example, add the accumulated sum of the prior color quantities to the color index values of every image in the current caption image file. Selectively address-shift and store the color index table according to the color quantities into the palette register. Preferably, address shift and store the current index table into the palette register according to the prior color quantities. Preferably, store the color index tables into the palette register sequentially according to the color quantities, and overwrite the palette register with the new color index table at the front-most location; and display the selectively offset-processed caption image file(s) according to the color index table(s).

In summary, the present disclosure effectively improves the shortcomings of many prior arts and has developed to be the main object of the present disclosure. The present disclosure may be applied to the embedded system of the television or the digital set top box and in between the television signals and the head-end systems, while the disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structure.

What is claimed is:

1. A caption display method applied in an embedded system of a digital television, the method comprising:
   receiving a first caption image file and a first color index table having a color quantity;
   storing the first caption image file and the first color index table;
   receiving a second caption image file and a second color index table;
   offset-processing the second caption image file according to the color quantity to provide an offset-processed second caption image file and storing the offset-processed second caption image file;
   address-shifting the second color index table according to the color quantity to provide an address-shifted second color index table and storing the address-shifted second color index table; and
   displaying the first caption image file and the offset-processed second caption image file according to the first color index table and the address-shifted second color index table, respectively,
   wherein the first caption image file and the offset-processed second caption image file are stored in a system memory of the embedded system, and the first and second color index tables are stored in a palette register of the embedded system.

2. The caption display method according to claim 1, wherein the offset-processing comprises adding the color quantity to a plurality of color index values in the second caption image file according to the color quantity.

3. The caption display method according to claim 1, wherein the address-shifting comprises address-shifting the second color index table by the color quantity.

4. The caption display method according to claim 1, wherein the displaying comprises displaying according to a plurality of color index values read out from the first caption image file with reference to color values at corresponding addresses in a palette register, and displaying according to a plurality of color index values read out from the offset-processed second caption image file with reference to the color values at the corresponding addresses in the palette register.

5. An embedded system, for use in a digital television, capable of receiving a signal from a head-end system comprising a first caption image file, a first color index table having a color quantity, a second caption image file and a second color index table, the embedded system comprising:
   a graphics engine having an offset processing unit that receives the second caption image file and offset-processes the second caption image file into an offset-processed second caption image file according to the color quantity;
   a memory interface unit, coupled to the graphics engine;
   a system memory, coupled with the memory interface unit, that stores the first caption image file and the offset-processed second caption image file; and
   a graphics output processor, coupled to the graphics engine, comprising a palette register that stores the first color index table and an address-shifted second color index table by address-shifting the second color index table according to the color quantity, the graphics output processor displaying the first caption image file and the offset-processed second caption image file read out from the graphics engine according to the first color index table and the address-shifted second color index table, respectively.

6. The embedded system according to claim 5, wherein the graphics output processor displays a plurality of color values read out from a plurality of corresponding addresses of the palette register according to color index values of the first caption image file, and displays a plurality of color values read out from a plurality of corresponding addresses of the palette register according to color index values of the offset-processed second caption image file.

7. The embedded system according to claim 5, wherein the offset processing unit adds the color quantity of the first color index table to color index values of the second caption image file.

8. The embedded system according to claim 5, wherein the graphics output processor address-shifts the second color index table according to the color quantity of the first color index table and stores the address-shifted second color index table in a memory location in the palette register.

9. A caption display method applied in an embedded system in a digital television, the method comprising:

receiving a plurality of caption image files and a plurality of color index tables, each color index table having a respective color quantity;

selectively offset-processing the caption image files and storing the offset-processed caption image files in a memory;

selectively address-shifting the color index tables according to the color quantities for being stored in a palette register; and displaying the offset-processed caption image files according to the color index tables, wherein the offset-processing comprises adding an accumulated sum of at least one prior color quantity of the color quantities to a plurality of color index values in a current caption image file of the caption image files.

10. The caption display method according to claim 9, wherein the offset-processing comprises selectively offset-processing the caption image files according to the color quantities and storing the offset-processed files in the memory.

11. The caption display method according to claim 9, wherein the offset-processing comprises offsetting a current caption image file of the caption image files according to at least one prior color quantity of the color quantities.

12. The caption display method according to claim 9, wherein the address-shifting comprises address-shifting a current index table of the color index tables according to at least one prior color quantity of the color quantities for being stored in the palette register.

13. The caption display method according to claim 9, wherein the address-shifting comprises sequentially storing the color index tables in the palette register according to the color quantities.

14. The caption display method according to claim 13, wherein the address-shifting further comprises overwriting a beginning location of the palette register with another color index table when the palette register is full.

* * * * *